March 14, 1933.    A. MOORE    1,901,849
FUELING INTERNAL COMBUSTION ENGINES
Filed Nov. 7, 1928    3 Sheets-Sheet 1
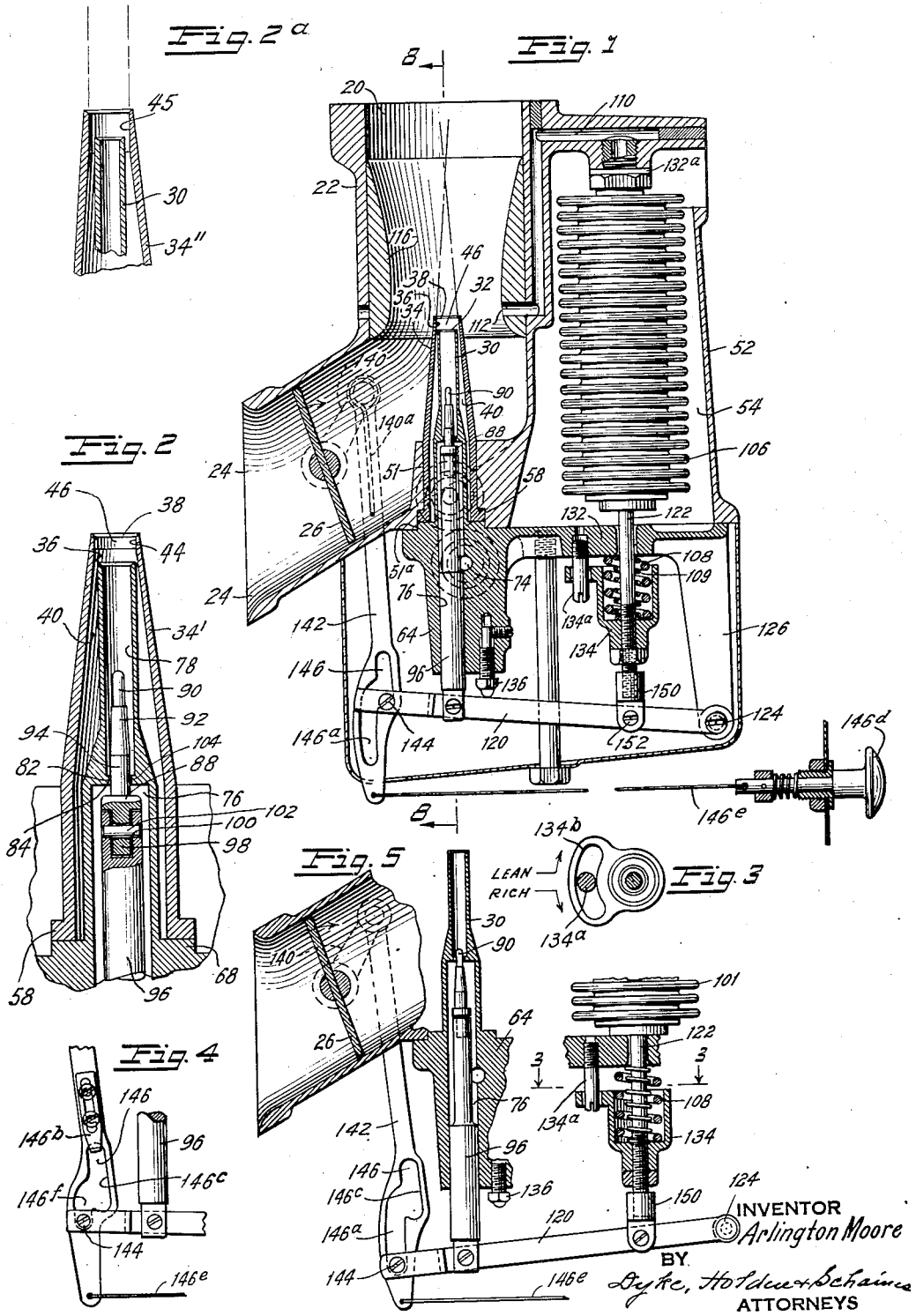
INVENTOR
Arlington Moore
BY
Dyke, Holder & Schaires
ATTORNEYS

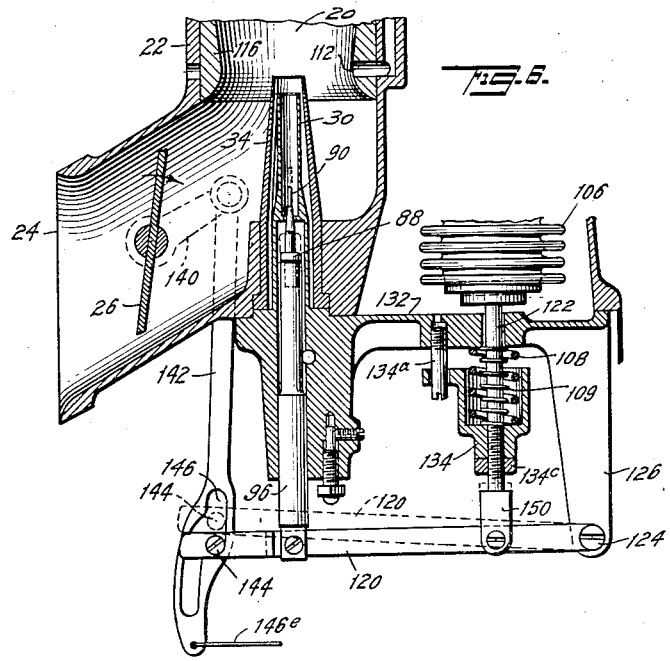
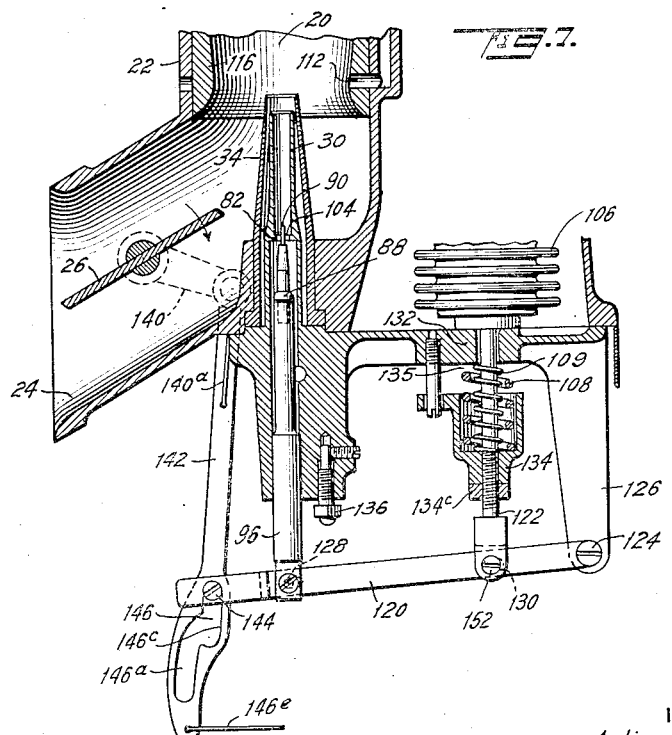

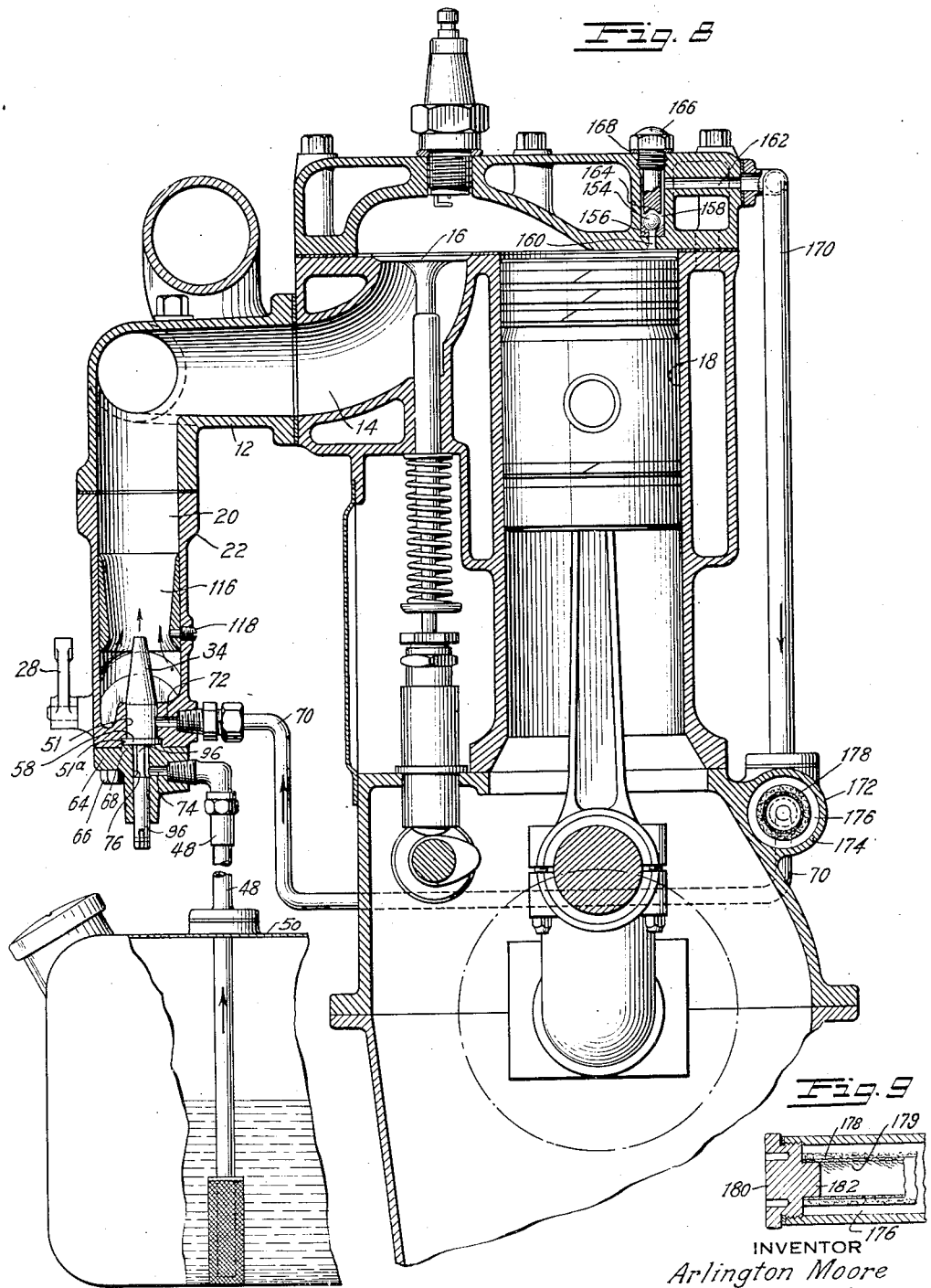

Patented Mar. 14, 1933

1,901,849

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

FUELING INTERNAL COMBUSTION ENGINES

Application filed November 7, 1928. Serial No. 317,750.

My invention relates to internal combustion engines and particularly to a process and apparatus in which the fuel delivered into the engine intake conduit is controlled by the conjoint effect of pressure reduction about the fuel orifice and variation of the fuel orifice area in response to pressure variations within the intake conduit.

The present application is in part a continuation of and in part an improvement upon my prior copending applications, Serial No. 280,205 of May 24, 1928, for supplying and mixing charges for internal combustion engines and Serial No. 304,040, of September 5th, 1928, for charging apparatus for internal combustion engines.

With the apparatus shown for illustration in application Serial No. 304,040, the fuel, supplied directly from the fuel tank located at a lower level than the fuel admission orifice to the engine, is delivered above the throttle through a passage the area or extent of opening of which is varied in direct relation to changes in intake pressure by means of a bellows exposed on its interior to the pressure reduction (depression below atmospheric) in the intake and on its exterior to the atmosphere. Said bellows serves upon decrease in intake pressure to reduce the fuel passage area and, under the action of spring means, upon increase in intake pressure to increase the fuel passage area.

The fuel delivery through the fuel passage so controlled is effected by atmospheric pressure on the fuel supply in response to the general pressure drop in the intake and to a local pressure drop about the fuel nozzle mouth created by injective action thereon of cylinder gases discharged under pressure, and the fuel is finely comminuted by said cylinder gases.

With the arrangement of application Serial No. 304,040, and with the bellows, spring, and fuel passage controlling means arranged, adjusted and proportioned to supply a desirably lean, economical charge mixture during fractional load operation, the intake pressure will automatically regulate the fuel supply to maintain substantially the predetermined ratio to the air supply. If the fuel supply is reduced, the leaner charge is not so effective in production of power and speed, so that the intake pressure rises and the fuel supply is brought back to or beyond that productive of the original mixture ratio; whereas if the fuel supply increases making the mixture richer and more of a higher power mixture, the power and speed tend to increase, reducing the intake pressure and cutting down the fuel and so substantially restoring the original mixture ratio.

If, however, there is a pressure rise which is out of line with fuel requirements, the resulting increase in fuel supply can be so great that the power and speed will fall off, with failure to restore the original mixture ratio, and the engine may strangle with excess fuel, and stall.

This may be due to several causes. For example it may result from too lean an original adjustment causing a popping back through the inlet valve, whereupon the intake pressure rapidly rises and the fuel supply is rapidly increased and there is a quick transition from excessive leanness of mixture to a strangulation from excess of fuel.

Upon quickly enlarging the throttle opening at fractional loads the intake pressure will rise momentarily and supply the extra fuel required for acceleration. If the throttle opening is not too sudden and the pressure rise at the moment of throttle opening supplies the acceleration fuel only, the intake pressure and fuel supply will be reduced as the engine settles away under the new conditions and substantially the original fuel-to-air ratio will be restored.

If, however, the momentary pressure rise upon opening the throttle wider to accelerate is too great, as may be the case with a sudden opening of the throttle, materially more fuel will be supplied than needel for acceleration, preventing the restoration of the original fuel-to-air ratio.

It is an object of the present invention, while controlling the fuel supply for fractional load operation to vary in the main with intake pressure, to also impose a further control of the fuel supply which prevents undue charge enrichment resulting from intake pressure rises which are out of line with fuel requirements. This is preferably accomplished mechanically by suitable connection with the manually operated throttle.

Another purpose is to entirely or substantially entirely prevent changes in fuel passage area taking place in response to changes in intake pressure at air passage area for which the fuel passage areas should be of fixed size, as for example, with minimum air opening minimum fuel passage area is desirable, and for maximum air passage area for full load operation it is desirable to have a fixed maximum fuel passage area. It is an object of the invention to positively bring and/or hold the fuel passage area to the minimum for minimum air passage area and maximum for maximum air passage area irrespective of changes that may take place in the intake pressure, and this is preferably accomplished through the throttle connection above referred to.

Engine conditions at starting and warming up, particularly in cold weather, call for considerable fuel in proportion to air, and it is one of the objects of the invention to make provision for temporarily providing enlarged fuel passage area at starting periods. This regulation of the fuel passage for starting is preferably accomplished through the control of the throttle connection above referred to.

I also find it desirable to utilize the air flow, particularly when the quantity and velocity of the air approach the maxima, as at full power operation with wide open throttle at high speed, for promoting the fuel delivery, and for this purpose preferably provide in the intake above the throttle a Venturi passage having a comparatively large throat opening which, however, is sufficiently constricted in comparison with the normal intake passage diameter, so that with the fuel nozzle located in such throat and subject to intake depression resulting from the passage of the large quantities of air at high velocities through this venturi, substantial promotion of fuel delivery is secured especially at high speed-full loads when the fuel supply must be at the maximum. In this way, I am enabled under the conditions just referred to to utilize for effecting the fuel delivery, not only (1) the general intake pressure drop and (2) the pressure drop resulting from the injective and comminuting discharge of cylinder gases about the fuel nozzle, but also to utilize said third source of pressure drop, namely the drop due to air flow through the Venturi throat, which apparently promotes fuel delivery more or less indirectly, as a result of pressure reduction in the region into which the fuel injecting gases are discharged. The provision of such air flow means for controlling and inducing fuel flow constitutes a further object of the invention.

I have also found that it is advantageous in order to secure accurate metering of the fuel under all conditions to make provision, as for example, by a fuel metering pin with a plurality of tapers for varying the rate of change in extent of opening of the fuel passage so that this passage is opened less rapidly for unit changes in intake pressure when there is a considerable drop in intake pressure below atmospheric, than during periods when the intake pressure is higher and approaches atmospheric pressure, and during said last named periods the fuel passage is opened more rapidly for a given longitudinal movement of the metering pin, and making of such provision constitutes a further object of my invention.

A further object of the invention consists in providing a fuel metering pin valve member so mounted as to have a limited, substantially universal movement upon its stem so that the metering pin is self-centering, or, in other words, is maintained in or floated into true axial relation to the fuel passage opening by the fuel flowing through such opening around and past the metering pin.

In the accompanying drawings I have shown such embodiment for purposes of illustration and understanding of the invention, but not for limitation thereof.

In said drawings:

Figure 1 is a cross-sectional view of a fueling device for attachment to the intake of an internal combustion engine, with the throttle in nearly closed position for engine idling, and with the fuel metering pin and its actuating mechanism in corresponding position.

Fig. 2 is a part sectional view on an enlarged scale of a part of Figure 1 with a slight modification of the cylinder gas nozzle tip.

Fig. 2ª is a fragmentary detail view showing a further modification of the cylinder gas nozzle.

Fig. 3 is a detail bottom plan view of a part of Fig. 1.

Fig. 4 is a fragmentary detail view of the preferred form of throttle hanger bar or link.

Fig. 5 is a fragmentary view similar to Fig. 1 and showing the position of the parts for engine starting.

Fig. 6 is a similar view showing intermediate positions of the fuel metering pin actuating mechanism in full and dotted lines.

Fig. 7 is a similar view with the parts in position for full load operation.

Fig. 8 is an assembly view in transverse section of an internal combustion engine equipped with the fueling device of Fig. 1 and showing an arrangement for the provision of cylinder gases under pressure and the filtering thereof and showing a connection to a low-level fuel tank, the fueling device section being approximately on line 8—8, Fig. 1.

Fig. 9 is a fragmentary detail view of the filter for cylinder gases.

Referring to the drawings, the intake manifold 12 communicates through ports 14 and inlet valves 16 with the engine cylinders 18. The intake manifold 12 has a mixing chamber 20 formed therein or otherwise constructed to communicate freely therewith. With the construction shown, the mixing chamber 20 formed in a hollow casting 22 which replaces the usual intake manifold riser or part thereof, and has a relatively wide flaring air inlet mouth 24 disposed at an angle to the axis of the mixing chamber, the extent of opening whereof is regulated by an air throttle valve 26 which is arranged for manual operation, and as for example in automobile engines, is operated by the customary hand or foot throttle connections applied to the crank arm 28. The mixing chamber 20 is preferably of cylindrical form and adapted for the passage of ample air therethrough into the intake manifold 12 without unnecessary retardation.

A fuel nozzle 30 having its tip 32 disposed within the mixing chamber 20 above the throttle 26 serves for the delivery of fuel into the air stream. A nozzle 34 surrounding the fuel nozzle 30 in spaced relation thereto provides, with the fuel nozzle 30, an annular passage 36 for conducting gaseous fluid, preferably gases from one or more of the combustion chambers of the engine cylinders, and effecting the discharge thereof through the tip 38 of nozzle 34 into the mixing chamber 20 at a point slightly beyond the tip 32 of fuel nozzle 30, said gaseous fluid exerting an inductive action on the fuel for delivery thereof and for blasting it into the air stream in highly comminuted state.

The passage in the nozzle for cylinder gases and the exterior of the fuel nozzle may be of various formations. For example nozzle 34 for cylinder gases may have a passage 40 therein of frusto-conical form, while the exterior of the fuel nozzle 30 may be cylindrical as shown at Fig. 1 and in this case the discharge is concentrated as indicated in dotted lines in Fig. 1.

Another formation desirable for use in avoiding back pressure when the cylinder gases are discharged at comparatively high pressures, is as shown in Fig. 2 in which back pressure is avoided by reaming that part of the mouth of the cylinder gas nozzle 34' extending beyond the fuel nozzle 30 with a short substantially cylindrical tip bore as indicated at 44. In case the cylinder gas is supplied at still higher pressure, the cylindrical tip bore of nozzle 34" is preferably longer and is extended inwardly below the tip of fuel nozzle 30 as indicated at 45 so that the discharge is directed as indicated in dotted lines in Fig. 2ª and in this way back pressure is avoided. Whatever the formation of the nozzles, the nozzle for cylinder gases, as 34, extends beyond the fuel nozzle as 30, to provide a circumferentially enclosed space 46 beyond the tip 32 of the fuel nozzle 30.

Gaseous fluid under pressure, preferably cylinder gases, pass at high velocity through the constricted orifice 36, past the tip 32 of the fuel nozzle 30 and causes together with the general intake depression a substantial reduction of pressure within the enclosed space 46 about and beyond the tip 32 so that the fuel is elevated by atmospheric pressure and delivered through pipe 48 from the main fuel tank 50, usually located at a lower level, as at the rear of an automobile for example, and forced out through the nozzle 30 and blasted into the air stream in finely comminuted state.

The nozzles 30 and 34 are preferably directed upwardly in the mixing chamber 20 to discharge in the direction toward the engine cylinders, and the construction is preferably such that the discharge of the cylinder gases and comminuted fuel is centrally located in the air stream, thus favoring the formation of a homogeneous charge mixture.

Nozzle 34 is secured in position within a bore 51 extending through the lower portion of the casting 22 intermediate of the air inlet 24 and the portion 52 of the casting 22 that forms a bellows receiving chamber 54.

The bore 51 in casting 22 has an enlargement 51ª at its lower end for receiving the flange 58 on the lower end of nozzle 34 and accurately positioning the nozzle 34 when same is forced into place in bore 51. Fuel nozzle 30 is preferably formed as a part of the under-casting 64 secured to casting 22 by bolts 66, and the projecting portion 68 thereof enters the recess 51ª formed in said casting 22 and into which recess 51ª the flange 58 of nozzle 34 has been forced leaving the lower part of recess 51ª open, and this substantially dowelling arrangement serves for obtaining accurate registration between the two casting members and for accurately centering the tip of fuel nozzle 30 in nozzle 34 and securing concentricity of the walls defining the passage 36.

The gaseous fluid from the engine cylinders supplied through pipe 70 passes through an opening at 72 into the annular passage 40 formed within the cylinder gas nozzle 34 and around the fuel nozzle 30 and is discharged through the annular passage 36 in inductive relation to the tip 32 of the fuel nozzle 30, thereby serving to aspirate the fuel and also serving to break up the fuel in a highly comminuted state resembling very fine fog or smoke.

The fuel supplied through pipe 48 passes through the hole 74 formed in the under-casting 64 into the bore 76 therein forming a continuation of the bore in fuel nozzle 30, whence it is delivered at nozzle tip 32.

The outer bore portion 78 of the fuel nozzle 30 is reduced in diameter as compared with the communicating bore passage 76 and bore passage 78 communicates with bore portion 76 through a still smaller fuel passage opening 82, the parts being formed with a shoulder 84 under and around the fuel jet passage 82 to coact with the fuel controlling means for metering the fuel.

The fuel metering means shown in Fig. 1 in its position for least opening of the fuel passage and in Fig. 7 in its position for widest opening thereof, has the form of a needle valve 88 having a short cylindrical extreme tip portion 90 of reduced cross-section which extends into the jet bore 82 as shown in Fig. 7 in order to pilot the needle valve and to provide between it and the jet bore 82 the widest or full power opening of the jet bore 82 (Fig. 7). This tip portion 90 is of cylindrical formation in order to permit if necessary some adjustment of the valve without change taking place in extent of opening of the fuel passage by slight movement of the tip portion 90 within the bore 82.

Below the cylindrical tip portion 90, fuel valve 88 has an enlarged slightly tapering portion 92 adapted to meter fuel as required during periods when the engine load is such that the drop in intake pressure below atmospheric is relatively small. Said portion 92 merges into a further lower portion 94 of slightly less angularity of taper than portion 92 and adapted for metering the fuel during periods when the pressure drop in intake approaches its maximum, that is, at low part load and idling operation of the engine. The taper of valve pin 88 must of course be made to suit conditions in practice and will vary with different engines, etc. In one case, with a six cylinder automobile engine of approximately 300 cu. in. piston displacement, good results were obtained with a metering pin having an outer taper at 92 of 75 minutes, and an inner taper at 94 of 30 minutes.

Valve 88 is preferably connected to its stem 96 by a joint permitting limited substantially universal or floating movement with respect thereto. This result may be sufficiently secured by inserting the reduced lower portion 98 of valve 88 into a blind hole 100 of slightly greater diameter than the portion 98 which is drilled into the upper end of the valve stem 96 and connecting the two together with a cross-pin 102 fitting tightly in a cross-bore in the stem 96 and having a little play in and particularly at and near the ends of a cross-bore formed in said end portion 98. The very slight play thus secured enables the valve to "float" and center itself in the jet bore 82, so that the annular fuel passage 104 between the valve pin and the jet bore is of substantially uniform width and the fuel flow is uniform all around. Since the fuel passage is at times subjected to vacuums of as high as 20" Hg it must be very small to keep the fuel supply within the correct limits under such circumstances. This floating needle arrangement is advantageous because by its use substantial uniformity in the width of the small annular fuel passage can be obtained at all times, while keeping within practical tolerance limits in manufacture.

The valve 88 controls the quantity of fuel supplied through the fuel nozzle 30 and provides at 82 an annular orifice 104 of cross-sectional area relatively constricted compared to that of the outer bore portion 78 of nozzle 30. The passage of the fuel through this constricted annular orifice 104 serves to disintegrate the fuel, and the bore 78, which is preferably larger in cross-section than the orifice of the ordinary fuel jet used in proportioning flow carburetor practice, provides a relatively free outlet passage for the fuel without appreciable retardation thereof due to frictional or capillary effects.

The fuel is already well broken up when it leaves the bore 78 at the fuel nozzle tip 32 and this is of assistance in securing fine comminution thereof when struck by the blast from 36.

The valve 88 is controlled by a pressure-responsive device or expansible-contractible element, such as the hollow bellows 106, fixed at one end, and resilient means including the springs 108 and 109 acting in conjunction therewith. The bellows 106 is disposed within the chamber or recess 54 formed in the portion 52 of casting 22 and open to the atmosphere. The passage 110 extends into the interior of the bellows through the fixed end thereof and communicates with the mixing chamber at the inlet 122 substantially coincident with a horizontal plane passing through the tip 36 of the nozzle 34, so that the fuel nozzle and the bellows inlet are affected substantially alike by pressure changes, while the exterior of the element 106 is exposed to full atmospheric pressure.

Said inlet opening 112 in the form shown extends into the throat 114 of a Venturi tube 116 inserted within the mixing chamber 20 and secured in place as by means of screw 118. The passage through the Venturi tube 116 is relatively large and such as not to materially reduce the cross-sectional area of the mixing chamber passage and, while the Venturi tube may be dispensed with if desired, it is preferably provided in order to obtain, particularly at full load high speed operating conditions, the benefit of the high air velocity present at such times for promoting delivery of the fuel in addition to the injectional action of the cylinder gases and such general pressure reduction as exists within the intake passage. By carrying the passage 110 upward for a material distance before it enters the bellows 106 likelihood of the liquid fuel entering the bellows is reduced to substantially the minimum.

The location of the inlet opening 112 in the throat of Venturi tube is favorable to getting a maximum pressure differential between that inside and outside the bellows 106 and promotes efficient bellows operation and fuel metering. By the provision of the Venturi tube 116 I am enabled to obtain a desirably high fuel delivery at fuel nozzle 30 during full load operation at high speed.

The valve pin 88 is operated by bellows 106 in response to variations in pressure differences between atmospheric pressure and the pressure above the throttle 26 in the region of the inlet opening 112, the extent of opening of the fuel passage 104 increasing as this pressure difference decreases and vice versa, so that the fuel passage area is increased with increase of intake pressure and is reduced with reduction of intake pressure, or, in other words, the extent of fuel passage opening varies substantially directly with variations of the intake pressure. This precise relation is modified, however, to suit engine requirements, by the several cross-sectional dimensions of the metering valve pin and also by mechanical actuation of the fuel metering pin described below.

In the form shown the bellows 106 operates the lever 120 by means of stem 122, and lever 120 pivoted at 124 to the arm 126 formed on or secured to the casting part 64 actuates the fuel modulating or metering pin 88. Pivotal connections to the valve stem 96 and to bellows stem 122 are preferably made by slots 128 and 130 in lever 120, (Fig. 7) to avoid binding of the parts.

In case the natural contacting and expanding movement of the bellows 106 in response to intake depression varying between zero and say, 25 inches Hg, is in excess of that permissible without undue fatigue, spring means are used to oppose all or part of the contracting movement of the bellows and assist the inherent expanding bellows movement, so that the bellows can be made responsive to the full range of intake pressure without movement of its free end through an unduly great distance.

Contracting movement of the bellows 106 responsive to pressure reduction in passage 20 moves valve 88 towards its closing position. Such movement is opposed in the form shown by spring means including the inherent resiliency of the bellows 106 and the supplementing springs 108 and 109, spring 108 being relatively stronger and stiffer and spring 109 being lighter and more flexible. These springs 108 and 109 encircle the bellows stem 122 and are interposed between the bracket 132 projecting from the undercasting 64 and the adjustable screw collar 134 on the stem 122, by which said springs 108 and 109 are supported. A slight clearance is preferably left at 135 between the fully expanded spring 108 and the arm 132, and in moving through this distance the resiliency of the bellows and spring 109 alone oppose the contraction of the bellows and produce its expansion upon intake pressure rise. While the constantly acting spring 109 can be dispensed with in case of a bellows that maintains all its inherent resiliency indefinitely, it is best to provide such constantly acting spring 109 since with its provision any slight permanent "set" or loss of inherent resiliency of the bellows will not interfere with proper working of the apparatus. The clearance at 135 and spring tension of springs 108 and 109 can be adjusted by means of collar 134. Screwing collar 134 upwardly tends to produce an increased spring tension and so open the fuel valve further against a given intake depression and thus increase the fuel ratio to air, and the opposite adjustment has the reverse effect and reduces the fuel component.

The pin 134ª received within the arcuate slot 134ᵇ on the member 134 serves as a stop to limit the adjustment of the collar 134, the latter when adjusted being locked by lock nut 134ᶜ. The contracting movement of the bellows is limited by the lever 120 engaging the adjustable stop 136 and this stop 136 determines the minimum fuel orifice position of the valve 88.

The upper surface of the bracket 132 serves as a stop for limiting the expanding movement of the bellows 106 and thereby determining the wide open position of the fuel metering pin 88 and for maintaining the bellows under initial compression, the initial compression imposed on the bellows being adjusted by suitable expedients such as by varying the thickness or number of washers 132ª interposed at the upper end of the bellows.

The movement of the valve pin 88 relative to the bellows 106 is also varied by adjustment of the pivotal connection between the bellows stem 122 and the lever 120. For this purpose a clevis 150 is connected to the end of bellows stem 122 by a finely pitched threaded connection and carries pivot pin 152 riding in slot 130 of bar 120. When the pivot pin 152 and lever 120 are disconnected, the clevis 150 may be adjusted through one or more 180° turns and the parts reconnected. The angularity of the lever 120 resulting from the adjustment of the clevis 150 and the location of the stop 132 determine the wide open position of the fuel metering pin 88.

Fuel metering valve 88 is also subject to manual control through the lever 120 in order to limit or partially restrain the extent of opening of the fuel passage in response to abnormal changes in intake pressure through the bellows 106 upon actuation of the throttle, to move valve 88 towards closing position for idling operation against the compression tension of springs 108 and 109 which at slightly beyond idling operation exceeds the pull exerted through bellows 106, and to lock the fuel metering pin against movement at the idling and full load position of the throttle. Such manual control is preferably secured by interconnection with the throttle 26 itself, so that separate actuating means requiring the operator's attention are rendered unnecessary.

In the form shown the projecting end of the shaft of throttle 26 has a crank arm 140 of adjusted length secured thereto, and to crank arm 140 is pivotally connected a link or hanger 142, and said link 142 is in turn connected at its opposite end to the lever 120. The connection between the link 142 and lever 120 is preferably a lost motion connection and, as shown, comprises a pivot pin 144 on lever 120 riding in an elongated slot 146 formed in link 142. Said slot 146 has an offset lower extension 146$^a$ thereof for use at starting. Preferably the slot 146 is made adjustable as to length by means of the screw fastened slide or stop 146$^b$ shown in Fig. 4. A light spring 140$^a$ at the connection of link 142 to crank arm 140 serves to keep the back wall 146$^c$ of slot 146 against pivot pin 144 thus confining the normal engagement between the link 142 and pivot pin 144 to the slot part 146. To bring the pivot pin into engagement with the extension portion 146$^a$ for starting suitable means are provided, such as a spring retracted dash knob 146$^d$ connected to link 142 by the wire 146$^e$, the latter being slightly slack so as not to interfere with the operation of link 142.

Upon deceleration throttle movement as from the position of Fig. 6 or 7 to the idling position of Fig. 1, the intake pressure decreases, bellows 106 contracts, and the lever 120 moves toward stop 136 which determines the position of valve pin 88 for minimum fuel passage area. The lower end of slot 146 follows the pin 144 up and ultimately engages the same to positively move the valve 88 against the spring tension into idling position and at idling position of the throttle positively supports bar 120 in engagement with stop 136 regardless of intake pressure to hold the valve pin 88 at the position for minimum fuel passage area. The valve pin 88 will be held at the position for minimum fuel passage area if the engine is stopped with the throttle in idling position as is common where a spring retracted acceleration pedal is made use of.

As the throttle opens the opening movement of valve 88 under the action of springs 108, 109 is mechanically controlled by the slot 146 in the lower end of which the pivot pin engages, the valve 88 moving with the throttle in each direction near idling position, and the fuel passage area being predetermined by and definitely restricted for each increment of throttle movement so as to permit passage of no more than the required fuel notwithstanding the intake depression is very high. At wide open throttle the upper end of slot 146 engages pin 144 and mechanically holds the lever 120 so that the fuel valve 88 is in position for maximum fuel passage area. In this way the maximum fuel passage area is always available with maximum air passage area, that is to say, at all full load conditions, regardless of what the engine speed and intake pressure may be.

For the intermediate throttle positions between the two extremes, the fuel metering pin is ordinarily not positively actuated manually through link 142, but in such intermediate positions of the throttle and link 142, and particularly at throttle openings for fractional loads and relatively high intake depression, the bottom end of the slot 146 is in position for imposing a limit upon downward movement of the lever 120.

Upon sudden opening movements of the throttle from any position of less opening to one of wider opening, the intake pressure momentarily rises to an abnormal extent and finally returns to its normal lower value for the resulting throttle position.

This abnormal rise in intake pressure would cause the fuel modulating pin to open to a corresponding extent which would supply more fuel than would be required during the resulting accelerating period. The lower end of the slot 146, however, limits this opening movement of the needle so that due enrichment of mixture results upon acceleration, without permitting excessive enrichment due to excessive opening movement of the needle valve. This is diagrammatically indicated at Fig. 6 in which the lever 120 is shown in full lines in its lower limited position, to whch position it temporarily moves to supply increased fuel when the throttle 26 is suddenly moved to the position shown.

The lower end of the slot 146 limits the downward movement of the lever 120 which, under the sudden or abnormal rise of intake pressure, would in the absence of such limiting means open more than desired, unduly enriching the charge mixture. When the intake pressure returns to its normal value for the position of the throttle as shown, the lever 120 assumes a position as indicated in broken lines with the pivoted pin 144 floating freely in the middle of the slot 146 or moving therein in response to movement of the bellows 106. In this floating or intermediate position the needle valve forms a fuel orifice opening of the size necessary to supply the required fuel for the particular throttle position and the particular engine speed which determined the intake pressure.

The slot 146 of hanger bar 142 is normally kept in engagement with pivot pin 144 of the fuel valve operating lever 120 by the light spring 140ª. Such engagement of slot 146 with pivot pin 144 serves during normal operation, after the engine has been warmed up, to mechanically hold the fuel metering pin to minimum and maximum openings for minimum and maximum air throttle openings respectively, and variably limits the opening of the fuel metering pin in response to intake pressure changes during fractional load operation.

Considerable extra fuel is required for engine starting. Considerable extra fuel is also needed during warming up periods if the engine is to be idled slowly while warming up.

In case provision for slowly idling the engine while warming up is not deemed essential, I may temporarily restore the condition of Serial No. 304,040 by eliminating any connection between the throttle and fuel metering pin, as by providing the slot 146 with the elongated downward extension 146ª, Figs. 1 and 5, and by pulling on the dash knob 146ᵈ, whereby link 142 is moved to disengage pivot pin 144 of lever 120 from slot 146 so that it may engage the slot portion 146ª. When this is done, the engine not having been started, the lever 120 is moved down by its spring and moves the fuel metering pin to widest open position. Throttle movement is now without effect on the position of the fuel metering pin, however subject to operation in response to changes in intake pressure.

Upon starting the engine with the knob 146ᵈ so pulled out, ample fuel is available and, should the fuel supplied through the open fuel passage be more than is wanted, the correct mixture ratio can be restored by opening up the air throttle somewhat, and by opening and closing the throttle several times and running the engine tolerably fast, it can be started and operated as desired, and then the normal relation of the hanger bar 142 restored upon releasing the knob 146ᵈ.

When slow idling operation during warming up periods is considered desirable, I make the extension part of slot 146 shorter as shown as 146ᶠ, Fig. 4. With this arrangement the additional fuel supply available at starting is relatively less than with the provision of the elongated slot portion 146ª, and so the possibility of engine strangling from excess fuel is avoided. After starting preferably with the throttle practically closed or only slightly opened, the engine can be idled slowly, and as it warms up and runs smoothly and evenly the bar 120 is gradually raised from its support by the lower end of slot extension 146ᶠ by the lowering of the intake pressure, thereby reducing the fuel passage area and automatically bringing the mixture ratio to the economically lean mixture for normal idling operation. The knob 146ᵈ having been released, the pivot pin 144 is reengaged with the slot 146 for normal operation control as described.

As will be observed, the arrangement of Fig. 4 provides two interchangeable locks or stops for fuel pin opening movement corresponding to minimum air throttle opening; the bottom of slot 146 serving for this purpose during normal operation and the fuel pin being held thereby against stop screw 136 so that its position is fixed; and the bottom of slot extension 146ᶠ serving to limit the fuel pin opening during slow idling operation for warming up purposes, and with this stop the fuel passage area can be reduced in response to lowering of the intake pressure as the engine warms up and begins to operate normally. In this way the settings for normal operation do not need to be disturbed for seasonal adjustments, as for example, to give an enrichment of mixture for idling during the winter season.

The gaseous fluid discharged through the nozzle 34 into the mixing chamber 20 may be taken from any source whereby the pressure rises and falls with increase and decrease of engine speed, as a compressor operated by the engine, an extra compressor cylinder or cylinders built into the engine or the like, but is preferably taken as shown herein from the combustion chamber of the engine cylinder or cylinders 18. The means shown herein for supplying the cylinder gases consists of a ball check 154 disposed upon a conical seat 156 within a recess 158 disposed within the water jacketed portion of the cylinder head. Said ball check 154 is adapted to be lifted by the escaping cylinder gases passing through the passage 160 communicating with the combustion chamber of the cylinders, so that the outlet passage 162 is open at all times when the pressure on the cylinder side exceeds the pressure on the other side of the ball together with the weight of the ball.

The ball check 154 is freely movable except for its own weight and is kept in proper position for coaction with its seat 156 by entering the conical recess 164 in centering and movement limiting plug 166 threaded into and closing the upper end of the recess 164. Washers 168 of any desired thickness may be used to permit any desired extent of movement of ball check 154.

The outlet 160 from the combustion chamber is sufficiently large so as not to be readily clogged by carbon or other solids which may be present. The conical surfaces of the valve seat 156 and the recess 164 in the plug 166 are each at an angle of substantially 45° to the axis, so that said conical surfaces as the ball 154 strikes the same are normal to the radii of the ball, and the stresses imposed on the ball are radially directed toward the center thereof and not eccentrically. This prevents the ball from becoming flattened or distorted, prolonging the life thereof, and insuring that the ball will seat evenly to prevent leakage even after considerable use thereof. The ball and its seat and limiting plug are preferably made of heat, rust, and corrosion resisting alloy steel.

The plug 166 is so adjusted by use of washers 168 of given thickness that the maximum size of the opening produced by clearance between the ball 154 and its seat when the ball is lifted against the plug is considerably less than the size of the outlet passage 160 from the combustion chamber. The maximum clearance is such as to not unduly decrease the pressure within the cylinders, and the rapid vibratory movement of the ball serves to maintain the clearance spaces and passages substantially free from adherence of solid matter.

The outlet passage 162 communicates with the space 40 in the cylinder gas discharge nozzle 34 through pipe 170, filter 172, and pipe 70 already referred to. The gas filter 172, when provided at original engine manufacture, preferably comprises a chambered part or member 174 projecting from the engine crank case and containing a chamber 176, and the cylinder gases pass into the side of said chamber through the pipe 170. The pipe 70 leading to nozzle 34 preferably has its inlet from said chamber at the center of one end of said member 174. Between the inlet to and outlet from said chamber 176 there is disposed a filtering means preferably consisting of a sleeve of woven asbestos or equivalent material 178, disposed around a tube of wire mesh material 179. The filtering means are preferably mounted between closing caps 180 for the chamber 176, and said caps 180 are provided with centrally extending bosses 182 of a size adapted to be encircled by the wire mesh tube 179, as will be clearly seen from the detail showing in Fig. 9. In this way the filtering means can be readily removed and renewed or cleaned without disturbance of pipes or other parts.

The following description of the operation of the embodimental apparatus under several conditions met in practice will afford an understanding of the principle underlying my new method of fueling for internal combustion engines.

At idling, after the engine has been warmed up and is operating normally, the fuel passage area is fixed, with the bar 120 held against stop 136 by hanger 142. If for any reason the intake pressure should rise somewhat without movement of the air throttle, there is no opening movement of the fuel passage and no resulting progressive enrichening of the idling mixture as could occur if the bellows alone were relied on to hold up the modulating pin, for the bar 120 and metering pin 88 are positively locked by link 142.

With the throttle slowly and gradually opened up somewhat for part power operation, the bottom end of slot 146 of throttle link 142 lowers to free pivot pin 144 and bar 120, and the differential between intake pressure and atmospheric pressure acting through bellows 106, bar 120 and valve 86 controls the fuel passage area free from modification by the throttle hanger mechanism.

If the throttle is quickly moved for acceleration, as, for example, from running an automobile on a level road at 12 miles per hour with an intake vacuum or depression of, say, 16″ Hg to 20 miles an hour, at which speed the intake depression will be about, say, 14″ Hg vacuum after the engine has steadied out under the new conditions, there is an intermediate instant of pressure rise, just when the throttle is moved and before the engine "picks up", when the intake vacuum may be as low as, say, 6″ Hg, the extent of this momentary pressure rise depending upon the existing load and the rapidity of the throttle movement for acceleration. With this pressure rise the bellows expands and the valve 88 opens somewhat, supplying needed fuel for acceleration, but, instead of valve 88 being opened to the extent that would be due to the momentary pressure rise on increase in the size of the air passage, bar 120 is held up by pivot pin 144 engaging the lower end of slot 146 of hanger 142, thereby preventing unduly great increase of fuel passage area and of richness of mixture, and then, as the intake pressure gradually goes back automatically to the normal 14″ Hg vacuum for 20 miles an hour speed, the fuel passage area is reduced in response to the reduction of intake pressure, the contraction of bellows 106 automatically lifting the bar 120 up and away from its support by the lower end of slot 146 in link 142.

Should the operator open the throttle quickly and immediately close it, say to idling position, some temporary enrichening of the mixture will of course result from the inertia of the liquid fuel and the persistence of high pressure cylinder gas blasting of the fuel, but progressive and cumulative mixture enrichening cannot ensue, notwithstanding there is some intake pressure rise, for downward movement of the bar 120 and opening of the fuel valve 88 are prevented by pin 144 engaging the lower end of slot 146 in link 142.

For full power operation, whatever the speed and intake pressure, the fuel passage area is the maximum, the valve 88 being held open by pin 144 engaging the upper end of slot 146 in throttle link 142. With low speed—full load operation and with the intake pressure substantially atmospheric or above atmospheric, and air velocity low, and cylinder gas fuel-blasting pressure below the maximum, because of low engine speed, the appropriate rather moderate fuel quantity is supplied principally by the cylinder gas injection and blasting. With full load—high speed operation the rather considerable additional fuel required is supplied through the same maximum fuel passage area, the valve 88 being held at its widest open position by means of throttle link 142, notwithstanding the reduction in intake pressure which accompanies the speeding up of the engine, and which, unless its action on fuel passage area was so limited or modified, would effect an undesirable reduction of fuel passage area, and during such full load—high speed operation the fuel supply is promoted by increase of blasting cylinder gas pressure for fuel injection, by the high velocity air flow through the throat of Venturi tube 116, and by the general intake depression incident to the engine speed even though the air throttle is at its position of maximum opening, all three cooperating to lift the fuel from tank 50 and supply it in comminuted form through nozzle 30.

For engine starting, the limits of movement of fuel valve as controlled by the throttle is temporarily increased on the rich side (Fig. 4 or Figs. 1, 5–8 inclusive) by pulling on the dash knob 146$^d$ and thus bringing the slot portions 146$^f$ or 146$^a$ of hanger link 140 into engagement with pin 144 of lever 120, and thereby permitting fuel valve 88 to open to such further extent as may be desired. Upon the engine being started the pivot pin 144 snaps into slot 146 and the control of the limits of fuel valve movement by throttle movement is automatically restored.

In accordance with my invention intake vacuum, gaseous fluid injection and air flow supplement each other to secure delivery of fuel in a comminuted state into the intake above the throttle. Fuel delivery under the action of the forces above referred to is controlled pneumatically by producing variations in fuel passage area in response to variations in intake pressure.

At times when the intake pressure is temporarily out of line with the requirements for fuel supply, the fuel supply is kept within suitable limits to secure substantially the optimum air to fuel ratio throughout the range of engine operation by controlling the pneumatic means mechanically, preferably by the throttle, to modify or limit the action of intake pressure upon the fuel supply means. Upon acceleration, the pneumatic means is controlled to effect the delivery of accelerating fuel without excess thereof due to excessive rise in intake pressure. At idling the pneumatic means is locked against operation so that sudden increases in intake pressure due to backfires or the like cannot increase the fuel passage area and so cause undue enrichment. At full load the pneumatic means is locked in wide open position so as to secure a full quantity delivery of cold, dense charge to the engine cylinders and to prevent reduction of fuel passage area upon speeding up, which reduction, if permitted to take place, would tend to cause undue leaning out of the mixture at full-load high speed operation. The apparatus is readily manipulated to permit of the delivery of the additional fuel necessary for starting and warming up before returning to position for normal operation.

While I have referred to atmospheric pressure at the air intake, it is to be understood that the air can be supplied at higher pressure when desired.

I claim:

1. The method of fueling an internal combustion engine which comprises controlling fuel delivery directly with and by variation in intake pressure, and throughout the load range of the engine, restraining the action of intake pressure variation from causing such direct fuel variation beyond the range of fuel requirements.

2. The method of fueling an internal combustion engine which comprises controlling the fuel delivery directly with and by variations in intake pressure, and imposing a limit on such direct fuel variation in response to relatively abrupt changes in intake pressure.

3. The method of fueling an internal combustion engine which comprises controlling the fuel delivery directly with and by variations in intake pressure, and imposing a limit on such direct fuel variation in response to changes in intake pressure occurring upon acceleration.

4. The method of fueling an internal combustion engine which comprises controlling the fuel delivery directly with and by variations in intake pressure substantially throughout the load range of the engine, and at intermediate loads imposing a maximum limit on fuel increases in response to intake pressure change.

5. The method of fueling an internal combustion engine which comprises controlling fuel delivery directly with and by variations in intake pressure substantially throughout the load range of the engine; and rendering intake pressure variations inoperative to cause direct variation of the fuel flowing at certain of the limits of said load range.

6. The method of fueling an internal combustion engine which comprises controlling the passage of air to the engine cylinders, controlling the fuel delivery directly with and by variations in intake pressure, and rendering intake pressure variations inoperative to vary the fuel directly at idling.

7. The method of fueling an internal combustion engine which comprises controlling the passage of air to the engine cylinders, controlling the fuel delivery directly with and by variations in intake pressure, and rendering intake pressure variations inoperative to vary the fuel directly at full load.

8. The method of fueling an internal combustion engine which comprises controlling the passage of air to the engine cylinders, controlling fuel delivery directly with and by variations in intake pressure, imposing a limit on direct fuel variations in response to changes in intake pressure at intermediate loads, and rendering intake pressure variations inoperative to vary the fuel directly at idling and full load.

9. The method of fueling an internal combustion engine which comprises controlling the passage of air to the engine cylinders, introducing fuel into the air stream beyond the point of control thereof by the injective action of a gaseous fluid, controlling fuel delivery directly with and by variations in intake pressure, and restraining intake pressure variations that are substantially out of line with the fuel requirements from causing direct fuel variations tending to upset the fuel-to-air ratio.

10. The method of fueling an internal combustion engine which comprises introducing fuel into the air stream by the action of general intake pressure reduction below atmospheric pressure, the injective action of a gaseous fluid, and the inductive action of the moving air upon the fuel orifice, and further regulating the fuel delivery in inverse relation to the intake depression.

11. The method of fueling an internal combustion engine which comprises controlling the passage of air to the engine cylinders, introducing fuel into the air stream beyond the point of control thereof by the action of the general intake pressure reduction below atmospheric pressure, the injective action of a gaseous fluid supplementing said pressure reduction and varying inversely therewith, and by the inductive action of the air stream, and further controlling fuel flow in inverse relation to the intake depression.

12. The method of fueling an internal combustion engine which comprises controlling the passage of air to the engine cylinders, introducing fuel into the air stream beyond the point of air control by the action of general intake pressure reduction below atmospheric pressure and the injective action of a gaseous fluid varying inversely therewith, and by subjecting the fuel orifice to the inductive action of the air stream for also causing variation in fuel flow directly with variations in the kinetic energy of the air stream, and further controlling the fuel flow directly with and by variations in intake pressure.

13. The method of fueling an internal combustion engine which comprises controlling the passage of air to the engine cylinders, introducing fuel into the air stream beyond the point of air control by the action of general intake pressure reduction below atmospheric pressure and the injective action of cylinder gases, and by subjecting the fuel orifice to the inductive action of the air stream to also cause variation in fuel flow with variation in kinetic energy of the air stream, and further controlling the fuel flow directly with and by variation in intake pressure.

14. The method of fueling an internal combustion engine which comprises controlling passage of air to the engine cylinders, injecting fuel into the air stream by the injective action of a gaseous fluid supplementing the action of general intake pressure reduction and varying inversely therewith, further controlling the fuel flow at fractional loads primarily directly with and by variation in intake pressure, and at full load primarily in response to variations in kinetic energy of the air stream and to other variations in pressure about the fuel orifice.

15. The method of fueling an internal combustion engine which comprises controlling the passage of air to the engine cylinders, introducing fuel into the air stream, controlling the flow of fuel at fractional loads directly with and by variations in intake pressure, rendering intake pressure variations inoperative to cause direct fuel variation at full load, and controlling fuel flow upon variation in speed at full load in response to variations in the kinetic energy of the air stream.

16. The method of fueling an internal combustion engine which comprises controlling the passage of air to the engine cylinders, effecting fuel delivery into the air stream by general intake pressure reduction below atmospheric pressure supplemented by the inductive effects of cylinder gases, controlling the flow of fuel at fractional loads directly with and by variations in intake pressure, rendering intake pressure variations inoperative to directly vary the fuel at full load, and controlling fuel flow upon variations in speed at full load in response to variations in kinetic energy of the air stream and in response to variations in the inductive effects of the cylinder gases.

17. The method of fueling an internal combustion engine which comprises controlling air to the engine cylinders, introducing fuel into the intake beyond the point of air control, controlling the fuel flow in substantially direct response to intake pressure changes while limiting such response in accordance with the extent of air control, and extending the normal maximum limit for fuel flow to increase the flow during periods of engine starting and/or warming up.

18. The method of fueling an internal combustion engine which comprises controlling fuel delivery in direct relation to and by variation in intake pressure, and throughout the load range of the engine restraining the action of such intake pressure variations that are substantially out of line with the fuel requirements from causing fuel variation tending to upset the fuel-to-air ratio, and extending the limit for fuel delivery to increase the same during periods of engine starting and/or warming up.

19. The method of fueling an internal combustion engine which comprises controlling the fuel delivery in direct relation to and by variations in intake pressure, imposing a limit on fuel variation in response to changes in intake pressure, and extending said limit to increase the fuel during periods of engine starting and/or warming up.

20. The method of fueling an internal combustion engine which comprises controlling fuel delivery in direct relation to and by variations in intake pressure, at idling preventing fuel variation by changes in intake pressure, and during periods of engine starting and/or warming up enlarging the range of fuel variation.

21. An apparatus for fueling an internal combustion engine comprising means for conducting fuel thereto, means for controlling fuel delivery by fuel passage area variation directly with and by variation in intake pressure, and means operative throughout the operating range of the engine for restraining the action of such intake pressure variations that are substantially out of line with the fuel requirements from causing fuel passage area variation tending to upset the fuel-to-air ratio.

22. An apparatus for fueling an internal combustion engine comprising fuel conducting means, means for controlling the fuel passage area directly with and by variations in intake pressure, and means coacting with said controlling means at intermediate positions in the range of movement thereof for imposing a limit on fuel passage area variation in response to changes in intake pressure.

23. An apparatus for fueling an internal combustion engine comprising fuel conducting means, means for controlling the fuel passage area directly with and by variations in intake pressure substantially throughout the fractional load range of the engine, and means for imposing a limit on fuel passage area variation at fractional loads in response to intake pressure changes.

24. An apparatus for fueling an internal combustion engine comprising an intake conduit, means for controlling the passage of air to the engine cylinders, means for conducting fuel thereto, means for controlling the fuel passage area in response to variations in intake pressure at fractional loads, and means for retaining the fuel passage area controlling means at fixed openings at idling and full load.

25. An apparatus for fueling an internal combustion engine comprising an air intake conduit, means for controlling the passage of air to the engine cylinders, means for conducting fuel into said conduit, means for controlling the fuel passage area in response to and directly with variations in intake pressure, and means for locking said fuel passage controlling means to prevent variations in the fuel passage area from maximum opening at full load.

26. An apparatus for fueling an internal combustion engine comprising an intake conduit, means for controlling the passage of air to the engine cylinders, means for conducting fuel into said conduit, means for controlling fuel delivery by variation in fuel passage area in response to and directly with variations in intake pressure, and means coacting with said fuel controlling means for allowing fuel passage area variations within limits in response to changes in intake pressure at fractional loads, and for retaining said fuel controlling means against movement to render intake pressure inoperative to vary the fuel passage area at idling and full load.

27. An apparatus for fueling an internal combustion engine comprising an intake, means for conducting fuel thereto, means responsive to intake pressure variations for varying the fuel passage area of said fuel conducting means directly with said variations, means for limiting the extent of movement of said pressure responsive means, and means for moving said limiting means to maintain the same in operative relation to said pressure responsive means substantially throughout the load range of the engine.

28. An apparatus for fueling an internal combustion engine comprising an intake, means for controlling the passage of air through said intake, means for supplying fuel thereto, means responsive to intake pressure variations for varying the fuel passage area of said fuel supplying means directly with said variations, and means operated by said air controlling means for limiting the extent of movement of said pressure responsive means upon abrupt changes in intake pressure.

29. Apparatus for fueling an internal combustion engine comprising an intake conduit, an air throttle therein, a fuel nozzle in said conduit on the side of the air throttle toward the engine cylinders, a valve in the fuel passage, means for operating said valve to vary the fuel supply passage in response to changes in intake pressure, a gaseous fluid pressure nozzle in inductive and injective relation to the fuel nozzle, means to supply gaseous fluid under pressure to said gaseous fluid nozzle, a Venturi passage in the intake conduit with said nozzles disposed at substantially the Venturi throat, a lost motion mechanical connection between the throttle and the fuel valve whereby the fuel valve opening is held at maximum and minimum for maximum and minimum throttle openings respectively and fuel valve movement in response to intake pressure is limited during fractional load operation, and means for temporarily producing extra fuel valve opening at engine starting and/or warming up.

30. An internal combustion engine comprising means for supplying fuel thereto having a fuel metering orifice, and a needle valve having a plurality of differentially inclined tapered portions successively movable in said orifice as the valve travels between the limits of movement thereof for differentially varying the fuel passage area at said orifice for fuel metering.

31. An internal combustion engine comprising means for supplying fuel thereto, and a valve having differentially inclined tapered portions and a tip of uniform cross-section for controlling said fuel supplying means.

32. An internal combustion engine comprising means for supplying fuel thereto including a passage, a valve having a tip portion received within and controlling said passage and having the end thereof pointing in the direction of fuel flow, and having a shank portion flexibly supporting said tip portion for freely centering the same within said passage under the action of the fuel passing through said passage.

33. An apparatus for fueling an internal combustion engine comprising an air conduit, a throttle for controlling the same, a Venturi portion in said conduit intermediate the throttle and engine cylinders; a fuel nozzle associated with said Venturi portion, means for discharging cylinder gas in inductive relation to said nozzle, and means responsive to variations in intake pressure beyond the throttle for controlling the fuel passage area.

34. In an internal combustion engine, an intake, a throttle, a venturi disposed in said intake at the engine side of the throttle and traversed by the air stream controlled by and passing the throttle, a fuel nozzle associated with said venturi and subject to the inductive effect of air flow therethrough and to intake depression, means for discharging high velocity gases in inductive relation to the fuel nozzle into the air stream at the venturi, the inductive action of the high velocity gases varying directly with the air flow to cause variation of fuel flow directly with the variations of both inductive effects, and means for automatically controlling the passage of fuel.

35. In an internal combustion engine, an intake, a throttle, a venturi disposed in said intake beyond the throttle and traversed by the air stream controlled by and passing the throttle, a fuel nozzle associated with said venturi, means for discharging high velocity gases in inductive relation to said fuel nozzle into the air stream in the venturi, and means for varying the fuel flow in a direction to oppose the effects of the variations in intake depression at the discharge end of the fuel nozzle.

36. In an internal combustion engine, an intake, a throttle, a fuel passage into the intake, a valve controlling said passage, a pressure responsive device including a spring for actuating said valve at fractional loads to vary the fuel passage area in inverse relation to the variations in intake depression, said spring acting to open said passage, and means movable with said throttle adapted to compress said spring at or near the idling position of the throttle and cause said valve to move with the throttle as the same closes, whereby to prevent operation of the valve by the variations in intake depression at or near idling.

37. Method of supplying and mixing charges for internal combustion engines in which fuel delivery is controlled over the higher portion of the fractional load range by variation of fuel passage area in inverse relation to and by the variations of intake depression, and at or near the idling portion of the fractional load range directly with variations in air supply and adjunctively with the control thereof while excluding the intake depression from causing variations in fuel passage area, and in which a limit is imposed on fuel passage area variation in response to intake depression changes over said higher portion of the fractional load range.

38. An internal combustion engine comprising fuel supplying means including a metering orifice, and a valve controlling said metering orifice and including shank and tip portions having a loose socketed connection, and means for pivotally connecting the portions and retaining the same in interengagement.

39. Method of supplying and mixing charges for internal combustion engines in which the air stream is constricted to produce a Venturi effect at a point beyond where the passage of air is controlled, and fuel is lifted and introduced in the air by the action of said Venturi effect, intake depression and the inductive effect of high pressure gases discharged into the air stream at the constriction thereof, and the fuel passage is varied in response to pressure variations.

40. The method of fueling an internal combustion engine which comprises introducing fuel into the air stream beyond the point of air control by intake depression supplemented by the injecting action of a gaseous fluid varying with the engine speed and/or load, varying the passage of fuel at fractional loads substantially in inverse relation to the variations in intake depression, and at full load operation augmenting the effects of the intake depression and the injecting action on fuel flow by Venturi effect of air flow.

41. Method of supplying and mixing charges for internal combustion engines which comprises controlling the passage of air to the engine cylinders, introducing fuel into the air stream at the engine side of the point of air control, varying the passage of fuel at fractional loads by and in inverse relation to intake depression, and at full load operation inducing fuel flow by Venturi effect of air flow while preventing inverse fuel passage variation in response to intake depression variations.

42. In an internal combustion engine, an intake, a throttle therein, a venturi in the intake at the engine side of the throttle and traversed by the air stream passing the throttle, a fuel line terminating in said venturi and subject to intake depression and air flow through the venturi for causing fuel flow, pressure responsive means having a passage independent of the fuel line communicating with the interior of the venturi for varying the fuel passage area in inverse relation to the Venturi pressure reduction at fractional loads, and means for retaining said pressure responsive means against movement at wide open throttle operation.

43. An apparatus for fueling an internal combustion engine comprising an air conduit, air controlling means therein, a fuel line terminating in said conduit, means responsive to the pressure reduction at the engine side of the air controlling means for varying the fuel passage area in inverse relation to the pressure reduction, and means controlled by the air controlling means for locking the pressure responsive means against movement at substantially wide open position of the air controlling means.

44. An apparatus for fueling an internal combustion engine comprising an air conduit, a throttle therein, a venturi therein at the posterior side of the throttle, a fuel nozzle terminating in said venturi, means for varying the fuel passage area in inverse relation to and by the intake depression variation, and means operated adjunctively to throttling for preventing closing off of the fuel passage at full load operation.

45. The method of supplying and mixing charges for internal combustion engines in which the air stream is constricted to produce a Venturi effect at a point beyond where the passage of air is controlled, and fuel is lifted and introduced into the air at said constriction in the region of pressure reduction by the action of intake depression and Venturi effect while being subjected to the comminuting action of an auxiliary gaseous stream discharged with the fuel into the air stream at said restriction subject to the Venturi effect, and the passage of fuel is controlled to counteract unfavorable fuel flow inducing effects of intake depression.

46. In an internal combustion engine, an intake, a throttle, a venturi disposed in said intake at the engine side of said throttle and traversed by the air stream controlled by and passing said throttle, coaxial nozzles having the discharge end thereof disposed within said venturi at the constriction thereof, one of said nozzles supplying fuel and the other of said nozzles supplying a gaseous fluid discharged in comminuting relation to the fuel, and both subject to the Venturi effect and intake depression, inducing fuel flow and promoting fuel atomization, and means for automatically varying the passage of fuel so as to coordinate the passage of fuel with the fuel flow inducing effects on the fuel nozzle to supply the fuel substantially in accordance with the air supply.

In testimony whereof, I have signed my name hereto.

ARLINGTON MOORE.